Feb. 6, 1962 P. W. THOMPSON ET AL 3,020,105
THRUST BEARING ARRANGEMENT FOR ROTATABLE MACHINES
Original Filed April 30, 1957
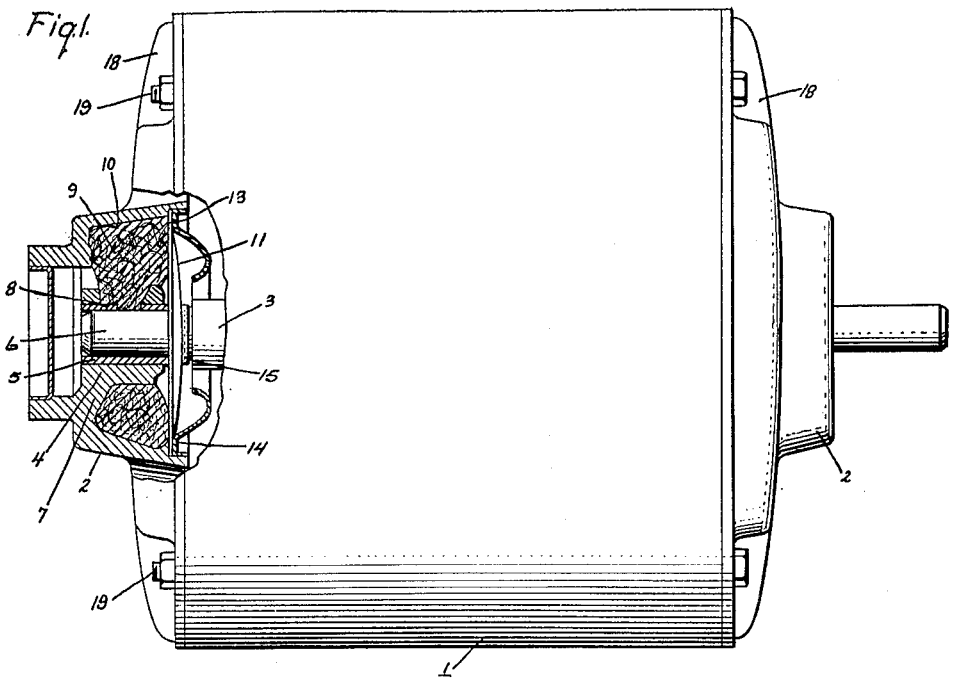
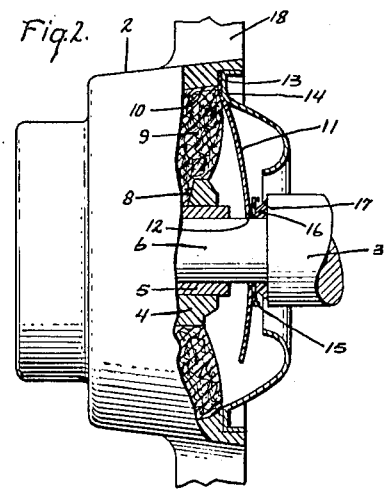
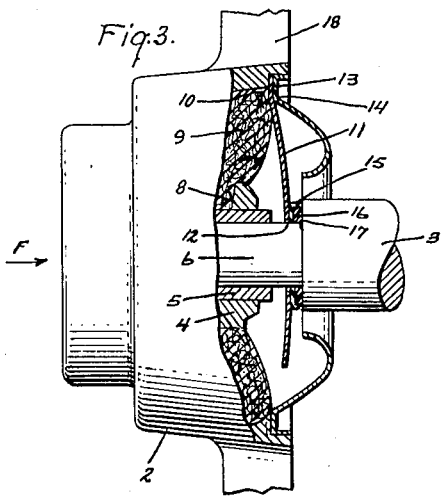
Inventors:
Paige W. Thompson,
Myron D. Tupper,
by John M. Stoudt
Attorney.

United States Patent Office 3,020,105
Patented Feb. 6, 1962

3,020,105
THRUST BEARING ARRANGEMENT FOR ROTATABLE MACHINES
Paige W. Thompson, Morrison, Ill., and Myron D. Tupper, Fort Wayne, Ind., assignors to General Electric Company, a corporation of New York
Original application Apr. 30, 1957, Ser. No. 656,133, now Patent No. 2,958,908, dated Nov. 8, 1960. Divided and this application Dec. 28, 1959, Ser. No. 862,250
2 Claims. (Cl. 308—163)

This invention relates to apparatus having rotatable parts, and more particularly to an improved thrust bearing arrangement for electric motors. The present application is a division of our copending application Serial No. 656,133, filed April 30, 1957, now Patent No. 2,958,908.

In equipment which is driven by rotatable machines, such as, for instance, electric motors, it is frequently necessary that the axial positioning of the rotatable driving shaft be precise, with a very limited amount of axial freedom. Such axial freedom, or "end play" as it is called, may have a pronounced effect on the operation of the device being driven. For instance, where an electric motor drives a part which rotates within a seal intended to keep fluid out, leakage through the seal is pronouncedly affected by the amount of end play of the shaft.

Accordingly, it is important to maintain the end play of the rotatable driving part, such as the motor shaft, to an absolute minimum. However, it is an established fact that the smaller the manufacturing tolerances allowed, the greater is the expense involved in the manufacture. Consequently, in the past, the cost of machines has risen substantially where little end play could be tolerated.

It is, therefore, an object of this invention to provide an improved assembly which restricts the end play of a rotatable shaft to a substantial extent without any undue increase in the cost of manufacture.

A further object of the invention is to provide end play controlling structure involving a minimum of addition over the structure normally used in thrust bearing arrangements.

In one aspect thereof, the invention provides, in a bearing assembly, a rotatable shaft which has a substantially radially arranged surface provided thereon. A part is mounted about the shaft and has a surface which is formed in a substantially radial plane axially spaced from the first mentioned surface. A stationary thrust bearing member is in thrust receiving engagement with the second mentioned surface, and a mass of cured thermosetting resin fills the axial space between the surfaces.

The features of the invention which are believed to be novel are set forth with particularity in the appended claims. The invention itself, however, together with further objects and advantages thereof may best be understood by reference to the following description taken in connection with the accompanying drawing.

In the drawing,

FIGURE 1 is a plan view of an electric motor, broken away at one end to reveal in cross section a bearing assembly including the improved end play determining means;

FIGURE 2 is an enlarged fragmentary view, partly in cross section, of the bearing assembly while it is undergoing the improved process of the invention; and FIGURE 3 is an enlarged fragmentary view, partly in cross section, of the improved bearing assembly after application of the improved method.

Referring now to FIGURES 1 to 3 of the drawing, there is shown an electric motor, generally indicated at 1, having a pair of bearing housing 2 respectively formed at each end in end shields 18. A shaft 3 is rotatably supported in the usual manner by bearings such as 4, each having a suitable bearing surface 5 in sliding contact with portion 6 of the shaft; each bearing 4 is supported by a housing 2 through the usual medium of an inwardly extending spider 7. An opening 8 is formed in the bearing 4, and a mass of lubricant-impregnated wicking 9 fills the space 10 between the housing 2 and the bearing 4 and extends through opening 8 into contact with shaft portion 6 so as to effect proper lubrication of the bearing. Wicking 9 is retained within the cavity 10 by a stationary member 11 which is provided with an opening 12 for shaft portion 6 and which has apices 13 provided at a plurality of points around its periphery, each apex being secured within housing 2 through the medium of a retainer member 14, as shown. Member 11 is formed of stiffly resilient material, and has its inner portion adjacent the shaft arranged in thrust bearing relationship with a washer 15 which has its surface arranged in a substantially radial plane for thrust bearing purposes. When finally assembled, washer 15 is rigidly secured about shaft portion 3 by a mass 16 of resin which has been cured to a hard unyielding consistency and which substantially fills the axial space between the surface of washer 15 and a substantially radially extending surface 17 formed by the shoulder where shaft portion 6 joins the remainder of the shaft 3. In order to effect the desired results, the resin 16 is of an entirely yielding nature before final assembly when it is in its uncured state, and hardens into a rigid unyielding mass once it has been cured.

In the assembly of the bearing, it is arranged, as shown in FIGURE 2, with washer 15 loosely mounted about shaft portion 6 and with uncured resin 16 of paste-like consistency filling the space between the washer 15 and the shaft surface 17. While a relatively standard washer 15 has been shown, modifications on this basic theme are readily apparent, and it is understood that part of the essence of the invention lies in the provision of a thrust surface spaced from suface 17 a predetermined axial distance, regardless of any particular washer arrangement. At this point, a force F is exerted on the bearing housing 2 while shaft 3 is secured rigidly against movement to the right, as viewed in FIGURE 2. This is easily effected, for instance, merely by assembling motor 1 and tightening bolts 19 to secure end shields 18 together. Force F is dependent on the tightness of the bolts, and thus inherently represents the amount of force which will be exerted upon the housing relative to the shaft during operation of the motor. In response to the force F, end shield 18 deforms, and member 11 is forced against the washer 15 so as to compress the washer 15 and the shaft surface 17 toward each other and compress the uncured resin (FIGURE 3). At this point, the resin is cured by any desired means such as, for instance, the ordinary heating process. The resin forms itself into a hard unyielding mass which secures the washer 15 about shaft portion 6 in the proper position for substantially zero end play to be obtained. If desired, the shaft 3 may be slowly rotated during the curing of the resin so that the surface of washer 15 will be in a true radial plane for thrust bearing purposes. To ensure that there will definitely be a little end play to preclude binding, the end shield 18 may be subjected to a predetermined additional force (as by impact, for instance) to cause a small predetermined additional amount of deflection. Another way to ensure a little end play is to maintain shaft 3 heated during the process. Once the shaft cools down to its normal temperature, it will shrink slightly and provide the desired small amount of end play.

Resin 16 may be any of several thermosetting resins with the selection being entirely dependent upon the optimum manufacturing arrangement found to be practical. Three such resins which are satisfactory, for instance, are epoxy type resins, polyester resins, and phenolic resins. Where the washer construction is as shown, it is preferable for the resin to have a paste-like consistency to remain in place between washer 15 and shaft surface 17 in its uncured state. This paste-like consistency may be readily provided by adding suitable fillers to liquid resins until the desired consistency is obtained. One such mixture which has proved suitable is 25% by weight epoxy resin, 25% polyamide, and 50% inert filler (such as mica, silica, or barium sulfate). Obviously, many other compositions are suitable for the purpose, and it is not intended to limit the invention to any specific compositions.

It will be seen from the foregoing that the invention provides a construction in which the end play of a motor may be readily controlled and held to a minimum in a simple economical manner.

While the invention has been explained by describing a particular embodiment thereof, it will be apparent that improvements and modifications may be made without departing from the scope of the invention as defined in the appended claims.

What we claim as new and desire to secure by Letters Patent of the United States is:

1. In a bearing assembly, a rotatable shaft, a raised surface provided on said shaft, a part mounted about said shaft and having a thrust bearing surface formed in a substantially radial plane, a stationary thrust bearing member in thrust receiving engagement with said second mentioned surface, said first and second mentioned surfaces being axially spaced a predetermined axial distance, and a mass of cured resin material disposed in the axial space between said surfaces, said resin material securing said part and shaft together in a predetermined permanently fixed relation.

2. In an electric motor, a rotatable shaft formed with a substantially radially extending shoulder, means rotatably supporting said shaft, and a thrust bearing arrangement for limiting the end play of said shaft, said arrangement comprising stationary thrust receiving means having a substantially radially extending thrust surface, a thrust member mounted on said shaft a predetermined axial distance from said shaft shoulder and having a thrust surface disposed towards said stationary thrust receiving means, and a mass of cured thermosetting resin positioned between said shoulder and said thrust member for securing said thrust member to said shaft in a permanently fixed relation at a predetermined axial distance from said shoulder and for maintaining the thrust surface of said member in a substantially radial plane.

References Cited in the file of this patent

UNITED STATES PATENTS

| | | |
|---|---|---|
| 2,078,783 | Welch | Apr. 27, 1937 |
| 2,307,874 | Bilde | Jan. 12, 1943 |
| 2,503,021 | Bennett | Apr. 4, 1950 |
| 2,919,150 | Baker | Dec. 29, 1959 |

FOREIGN PATENTS

| | | |
|---|---|---|
| 723,194 | Great Britain | Feb. 2, 1955 |

OTHER REFERENCES

Chemistry of Commercial Plastics by R. L. Wakeman, published by Reinhold Publishing Corp. (1947), see especially page 244.